United States Patent
Bogli et al.

(10) Patent No.: US 10,669,121 B2
(45) Date of Patent: Jun. 2, 2020

(54) ELEVATOR ACCELEROMETER SENSOR DATA USAGE

(71) Applicant: Otis Elevator Company, Farmington, CT (US)

(72) Inventors: Craig Drew Bogli, Avon, CT (US); Guohong Hu, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 399 days.

(21) Appl. No.: 15/638,482

(22) Filed: Jun. 30, 2017

(65) Prior Publication Data

US 2019/0002238 A1   Jan. 3, 2019

(51) Int. Cl.
| | |
|---|---|
| *B66B 5/00* | (2006.01) |
| *G01H 1/14* | (2006.01) |
| *B66B 5/18* | (2006.01) |
| *B66B 19/00* | (2006.01) |
| *B66B 5/02* | (2006.01) |
| *G01H 1/00* | (2006.01) |

(52) U.S. Cl.
CPC .......... *B66B 5/0025* (2013.01); *B66B 5/0012* (2013.01); *B66B 5/0031* (2013.01); *B66B 5/0037* (2013.01); *B66B 5/0087* (2013.01); *B66B 5/022* (2013.01); *B66B 5/18* (2013.01); *B66B 19/007* (2013.01); *G01H 1/00* (2013.01); *G01H 1/14* (2013.01)

(58) Field of Classification Search
CPC ... B66B 5/0025; B66B 5/0031; B66B 5/0037; B66B 5/0087
USPC ........................................................ 187/393
See application file for complete search history.

(56) References Cited

U.S. PATENT DOCUMENTS

| | | | |
|---|---|---|---|
| 5,036,955 A | * | 8/1991 | Nakai ..................... B66B 5/022 187/278 |
| 5,135,079 A | | 8/1992 | Shimazaki |
| 5,294,757 A | | 3/1994 | Skalski et al. |
| 5,557,546 A | | 9/1996 | Fukai et al. |
| 5,597,988 A | | 1/1997 | Skalski |
| 6,494,295 B2 | * | 12/2002 | Grundmann .......... B66B 11/028 187/292 |
| 6,552,652 B2 | * | 4/2003 | Beken ................... B63B 22/003 340/407.1 |
| 7,007,774 B2 | * | 3/2006 | Utsunomiya ........... B66B 7/042 187/292 |

(Continued)

FOREIGN PATENT DOCUMENTS

| | | |
|---|---|---|
| CA | 2986495 A1 | 12/2016 |
| CN | 104098007 A | 10/2014 |

(Continued)

OTHER PUBLICATIONS

Partial European Search Report for Application No. 18180188.7-1017; Report Issued Date: Nov. 30, 2018; Report Received Date: Dec. 28, 2018; 13 pages.

*Primary Examiner* — David S Warren
(74) *Attorney, Agent, or Firm* — Cantor Colburn LLP (57) ABSTRACT

A method of monitoring vibratory signatures of an elevator car is provided. The method comprising: detecting at least one vibratory signature of an elevator car, the vibratory signature comprising: a first vibratory signature in a first direction; and determining a probable cause of the at least one vibratory signature by comparing the at least one vibratory signature to a known vibratory signature.

15 Claims, 8 Drawing Sheets

(56) References Cited

U.S. PATENT DOCUMENTS

| | | | | |
|---|---|---|---|---|
| 7,823,706 B2* | 11/2010 | Tyni | | B66B 5/0031 |
| | | | | 187/391 |
| 7,909,144 B2* | 3/2011 | Fukui | | B66B 5/02 |
| | | | | 187/292 |
| 8,418,815 B2* | 4/2013 | Encinas Carreno | .. | B66B 5/0006 |
| | | | | 187/247 |
| 8,540,057 B2* | 9/2013 | Schuster | | B66B 1/34 |
| | | | | 187/247 |
| 8,589,118 B2* | 11/2013 | Idemori | | B66B 29/005 |
| | | | | 702/151 |
| 8,893,858 B2 | 11/2014 | Shi et al. | | |
| 9,309,089 B2* | 4/2016 | Annen | | B66B 5/0037 |
| 9,556,002 B2* | 1/2017 | Wilke | | B66B 5/0025 |
| 9,604,818 B2* | 3/2017 | Kallioniemi | | B66B 5/0018 |
| 10,042,341 B1* | 8/2018 | Jacob | | G06Q 40/08 |
| 10,196,236 B2* | 2/2019 | Sonnenmoser | | B66B 5/0018 |
| 10,407,274 B2* | 9/2019 | Wang | | B66B 1/3492 |
| 2002/0046906 A1* | 4/2002 | Grundmann | | B66B 11/028 |
| | | | | 187/292 |
| 2004/0020725 A1* | 2/2004 | Utsunomiya | | B66B 7/042 |
| | | | | 187/292 |
| 2006/0266591 A1* | 11/2006 | Zhu | | B66B 7/06 |
| | | | | 187/411 |
| 2010/0140023 A1* | 6/2010 | Fukui | | B66B 5/02 |
| | | | | 187/292 |
| 2011/0106490 A1* | 5/2011 | Idemori | | B66B 29/005 |
| | | | | 702/154 |
| 2014/0008152 A1* | 1/2014 | Annen | | B66B 5/0037 |
| | | | | 187/247 |
| 2015/0344270 A1* | 12/2015 | Goldstein | | B66B 23/02 |
| | | | | 700/230 |
| 2016/0311660 A1* | 10/2016 | Goldstein | | B66B 23/02 |
| 2018/0162686 A1* | 6/2018 | Wang | | B66B 1/3492 |
| 2018/0257688 A1* | 9/2018 | Carter | | G01R 33/072 |
| 2018/0297819 A1* | 10/2018 | Goldstein | | B66B 23/02 |
| 2019/0002238 A1* | 1/2019 | Bogli | | B66B 5/0025 |
| 2019/0010019 A1* | 1/2019 | Koushik | | B66B 5/0037 |
| 2019/0010020 A1* | 1/2019 | Koushik | | B66B 5/0037 |

FOREIGN PATENT DOCUMENTS

| | | |
|---|---|---|
| DE | 19750350 C1 | 8/1999 |
| EP | 2489621 A1 | 8/2012 |
| JP | 5205754 B2 | 6/2013 |
| JP | 2015158458 A | 9/2015 |
| JP | 5897165 A | 3/2016 |
| WO | 03033388 A1 | 4/2003 |
| WO | 2006019167 A1 | 2/2006 |

* cited by examiner

ELEVATOR ACCELEROMETER SENSOR DATA USAGE

BACKGROUND

The subject matter disclosed herein relates generally to the field of elevator systems, and specifically to a method and apparatus monitoring vibratory signatures of an elevator car.

Currently acceleration along the vertical axis of an elevators car may be monitored in order detect whether to activate a safety brake. However it is desired to detect vibrations in the elevator car such that additional analysis may be performed.

BRIEF SUMMARY

According to one embodiment, a method of monitoring vibratory signatures of an elevator car is provided. The method comprising: detecting at least one vibratory signature of an elevator car, the vibratory signature comprising: a first vibratory signature in a first direction; and determining a probable cause of the at least one vibratory signature by comparing the at least one vibratory signature to a known vibratory signature.

In addition to one or more of the features described above, or as an alternative, further embodiments may include where the vibratory signature further comprises: a second vibratory signature in a second direction orthogonal to the first direction.

In addition to one or more of the features described above, or as an alternative, further embodiments may include where the vibratory signature further comprises: a third vibratory signature in a third direction orthogonal to the first direction and the second direction.

In addition to one or more of the features described above, or as an alternative, further embodiments may include activating an alarm in response to the probable cause being determined.

In addition to one or more of the features described above, or as an alternative, further embodiments may include transmitting the probable cause to a remote device.

In addition to one or more of the features described above, or as an alternative, further embodiments may include adjusting movement of the elevator car in response to the probable cause.

In addition to one or more of the features described above, or as an alternative, further embodiments may include stopping movement of the elevator car in response to the probable cause.

In addition to one or more of the features described above, or as an alternative, further embodiments may include determining the known vibratory signature in response to a speed of the elevator car and a diameter of roller guides of the elevator car.

In addition to one or more of the features described above, or as an alternative, further embodiments may include where if at least one of the second vibratory signature and the third vibratory signature includes a repetitious vibration, then the probable cause is determined to be a faulty roller guide.

In addition to one or more of the features described above, or as an alternative, further embodiments may include where if each vibratory signature includes a period of a high magnitude low frequency vibration, then the probable cause is determined to be seismic activity.

In addition to one or more of the features described above, or as an alternative, further embodiments may include where if the first vibratory signature includes at least one previously undetected low frequency vibration, then the probable cause is determined to be a jumping passenger.

In addition to one or more of the features described above, or as an alternative, further embodiments may include where if each vibratory signature includes a previously undetected vibration in the first direction and at least one of the second direction and the third direction when the elevator car is stopping, then the probable cause is determined to be an improperly engaged safety wedge system.

In addition to one or more of the features described above, or as an alternative, further embodiments may include where the first direction is parallel to a direction of travel of the elevator car.

According to another embodiment, a system for monitoring vibratory signatures of an elevator car is provided. The system comprising: one or more accelerometers operably connected to an elevator car, the one or more accelerometers configured to detect at least one vibratory signature of an elevator car, wherein the vibratory signature comprises: a first vibratory signature in a first direction; and a controller in communication with each accelerometer and configured to determine a probable cause of the at least one vibratory signature by comparing the at least one vibratory signature to a known vibratory signature.

In addition to one or more of the features described above, or as an alternative, further embodiments may include where the vibratory signature further comprises: a second vibratory signature in a second direction orthogonal to the first direction.

In addition to one or more of the features described above, or as an alternative, further embodiments may include where the vibratory signature further comprises: a third vibratory signature in a third direction orthogonal to the first direction and the second direction.

In addition to one or more of the features described above, or as an alternative, further embodiments may include where each accelerometers is located in an electronic safety actuator, the electronic safety actuator being operably connected to safety brake for the elevator car; and each accelerometer is configured to detect when to activate the safety brake.

In addition to one or more of the features described above, or as an alternative, further embodiments may include an alarm configured to activate in response to the probable cause.

In addition to one or more of the features described above, or as an alternative, further embodiments may include a remote device configured to receive the probable cause transmitted by the controller.

In addition to one or more of the features described above, or as an alternative, further embodiments may include a bump located on a roller guide of the elevator car, wherein the bump is configured to generate a vibratory signature that is imperceptible to passengers in the elevator car but perceptible to the one or more accelerometers when the elevator car is in motion.

Technical effects of embodiments of the present disclosure include detecting vibrations in an elevator car through at least one of three orthogonal axes and determining probably causes of vibrations in the elevator car.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
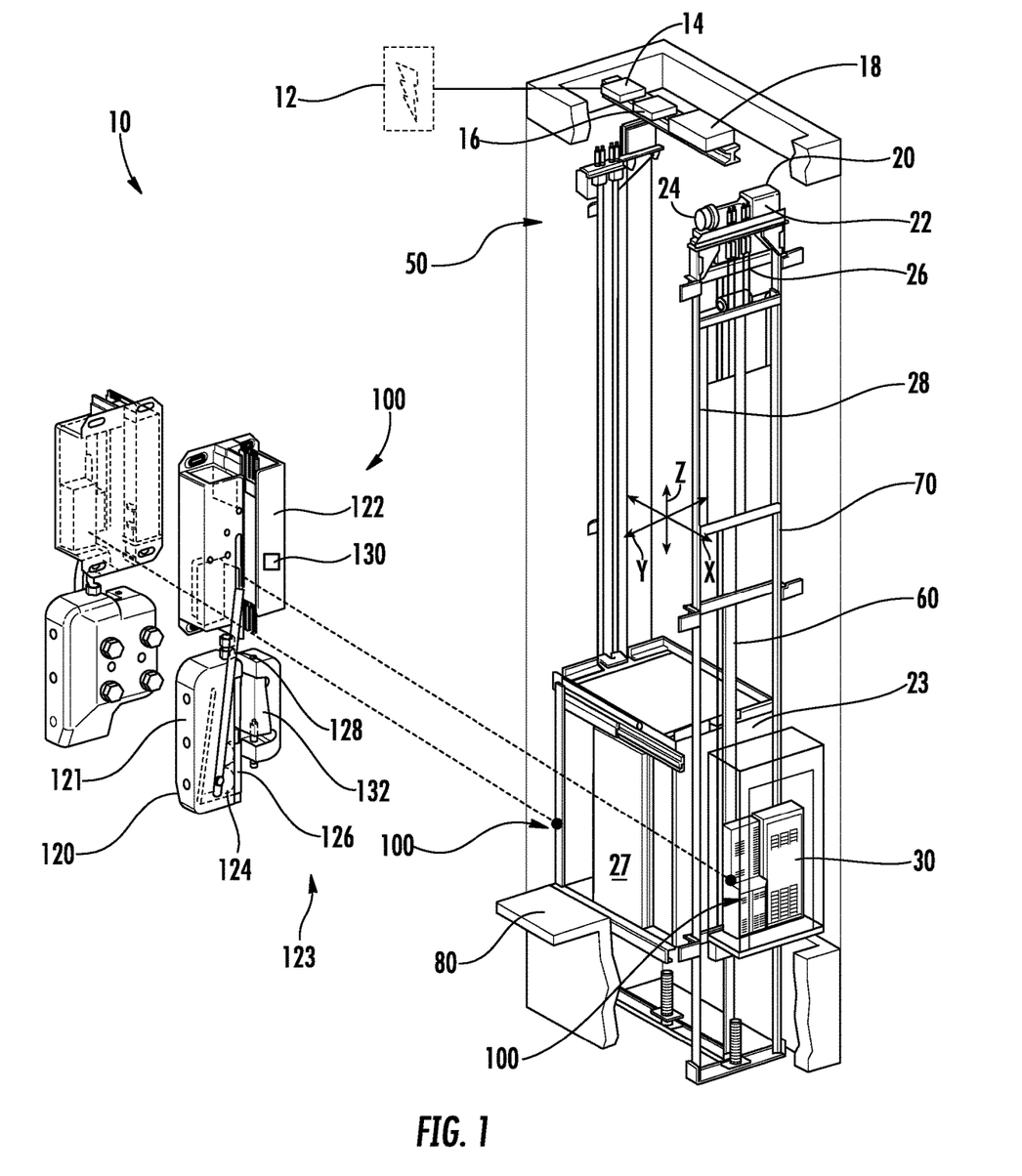
FIG. 1 illustrates a schematic view of an elevator system, in accordance with an embodiment of the disclosure.

FIG. 1 shows a schematic view of an elevator system 10, in accordance with an embodiment of the disclosure. With reference to FIG. 1, the elevator system 10 includes an elevator car 23 configured to move vertically upward and downward within a hoistway 50 along a plurality of car guide rails 60. The elevator system 10 may also include a counterweight 28 operably connected to the elevator car 23 via a pulley system 26. The counterweight 28 is configured to move vertically upward and downward within the hoistway 50. In addition, elevator systems moving laterally and/or diagonally may also be used. In one embodiment, the elevator car 23 may move laterally. In another embodiment, the elevator car 23 may move diagonally. The counterweight 28 moves in a direction generally opposite the movement of the elevator car 23, as is known in conventional elevator systems. Movement of the counterweight 28 is guided by counterweight guide rails 70 mounted within the hoistway 50. The elevator car 23 also has doors 27 to open and close, allowing passengers to enter and exit the elevator car 23 at a floor 80.

The elevator system 10 also includes a power source 12. The power is provided from the power source 12 to a switch panel 14, which may include circuit breakers, meters, etc. From the switch panel 14, the power may be provided directly to the drive unit 20 through the controller 30 or to an internal power source charger 16, which converts AC power to direct current (DC) power to charge an internal power source 18 that requires charging. For instance, an internal power source 18 that requires charging may be a battery, capacitor, or any other type of power storage device known to one of ordinary skill in the art. Alternatively, the internal power source 18 may not require charging from the AC external power source 12 and may be a device such as, for example a gas powered generator, solar cells, hydroelectric generator, wind turbine generator or similar power generation device. The internal power source 18 may power various components of the elevator system 10 when an external power source is unavailable. The drive unit 20 drives a machine 22 to impart motion to the elevator car 23 via a traction sheave of the machine 22. The machine 22 also includes a brake 24 that can be activated to stop the machine 22 and elevator car 23. As will be appreciated by those of skill in the art, FIG. 1 depicts a machine room-less elevator system 10, however the embodiments disclosed herein may be incorporated with other elevator systems that are not machine room-less or that include any other known elevator configuration. In addition, elevator systems having more than one independently operating elevator car in each elevator shaft and/or ropeless elevator systems may also be used. In one embodiment, the elevator car may have two or more compartments.

The controller 30 is responsible for controlling the operation of the elevator system 10. The controller 30 may include a processor and an associated memory. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium.

FIG. 1 also illustrates a brake assembly 100 for an elevator system 10. The brake assembly may be operable to assist in braking (e.g., slowing or stopping movement) of the elevator car 23. In one embodiment, the braking is performed relative to the guide rail 60. The brake assembly 100 can be used with various types of elevator systems. The brake assembly 100 includes a safety brake 120 and an electronic safety actuator 122 that are each operatively coupled to the elevator car 23. In some embodiments, the safety brake 120 and the electronic safety actuator 122 are mounted to a car frame of the elevator car 23. The safety brake 120 includes a safety wedge system 123, such as a brake pad or a similar structure suitable for repeatable braking engagement, with the guide rail 60 and safety wedge system 123. The safety wedge system 123 has a contact surface 126 that is operable to frictionally engage the guide rail 60. In one embodiment, the safety brake 120 and an electronic safety actuator 122 may be combined into a single unit. In a non-limiting example, FIG. 1 shows an instance of safety brake 120 that has a safety wedge system 123 which has sliding wedge 124, and releasing wedge 132. When the safety brake 120 is actuated the sliding wedge 124 and the releasing wedge 132 perform the braking function. During actuation of the safety brake 120, the sliding wedge 124 is lifted along predefined path toward the guide rail 60 until it makes full contact with the guide rail 60 and the elevator car 23 is subsequently forced to move horizontally towards the landing door direction (i.e. Y direction in FIG. 1). After a running clearance between the sliding wedge 124 and the guide rail 60 is reduced to zero, the releasing wedge 132 makes fully contact with the guide rail 60. During safety reset, the elevator car 23 moves up and each of the releasing wedge 132 and the sliding 124 move down relative to a housing 121 of the safety brake 120. It is understood that other safety wedge systems 123 may be used. For example, a symmetric safety wedge system 123 that is composed of two sliding wedges rather than one sliding and one releasing wedge may be used. A mechanism may be used to connect both sliding wedges for actuation/reset.

The safety brake 120 is operable between a non-braking position and a braking position. The non-braking position is a position that the safety brake 120 is disposed in during normal operation of the elevator car 23. In particular, the contact surface 126 of the safety wedge system 123 is not in contact with, or is in minimal contact with, the guide rail 60 while in the non-braking position, and thus does not frictionally engage the guide rail 60. In the braking position, the frictional force between the contact surface 126 of the safety wedge system 123 and the guide rail 60 is sufficient to stop movement of the elevator car 23 relative to the guide rail 60. Various triggering mechanisms or components may be employed to actuate the safety brake 120 and thereby move the contact surface 126 of the safety wedge system 123 into frictional engagement with the guide rail 60. In the illustrated embodiment, a link member 128 is provided and couples the electronic safety actuator 122 and the safety brake 120. Movement of the link member 128 triggers movement of the safety wedge system 123 of the safety brake 120 from the non-braking position to the braking position.

In operation, an electronic sensing device and/or a controller 30 is configured to monitor various parameters and conditions of the elevator car 23 and to compare the monitored parameters and conditions to at least one predetermined condition. In one embodiment, the predetermined condition comprises speed and/or acceleration of the elevator car 23. In the event that the monitored condition (e.g., over-speed, over-acceleration, etc.) meets the predetermined condition, the electronic safety actuator 122 is actuated to facilitate engagement of the safety brake 120 with the guide rail 60. In some embodiments, the electronic safety actuator 122 has a velocity sensor and an accelerometer 130. Data is analyzed by the controller 30 and/or the electronic safety actuator 122 both to determine if there is an overspeed or over acceleration condition. If such a condition is detected, the electronic safety actuator 122 activates, thereby pulling up on the link member 128 and driving the contact surface 126 of the safety wedge system 123 into frictional engagement with the guide rail 60—applying the brakes. In some embodiments, the electronic safety actuator 122 sends this data to the elevator controller 30 and the controller 30 sends it back to the electronic safety actuator 122 and tells it to activate.

In an embodiment two electronic safety actuators 122 (one on each guide rail) are provided and connected to a controller 30 on the elevator car 23 that gets data from the electronic safety actuators 122 and initiates activation of the electronic safety actuators 122 for synchronization purposes. In further embodiments, each electronic safety actuator 122 decides to activate on its own. Still further, one electronic safety actuator 122 may be "smart" and one is "dumb," where the smart electronic safety actuator gathers the speed/acceleration data and sends a command to the dumb one to activate along with the smart electronic safety actuator.

In an embodiment, each electronic safety actuator 122 contains an accelerometer 130 to detect an acceleration (e.g. vibratory signatures) in a direction X, direction Y, and/or direction Z, as seen in FIG. 1. In operation, the controller 30 is configured to monitor vibratory signatures of the elevator car 23 in the three directions X, Y, Z and compare the vibratory signatures to at least one known vibratory signature. In one embodiment, the controller 30 may analyze the vibratory signatures in one, two or all three of direction X, direction Y, direction Z. In one embodiment, a single accelerometer 130 may measure all three directions. In one embodiment, multiple accelerometers 130 may each measure acceleration in a single direction. Analyzing a vibration signature in at least one of the direction X, direction Y, and direction Z may help detect vibration related faults and occurrences involving the elevator car 23, discussed further below in relation to FIGS. 4-9.

Figure 2:
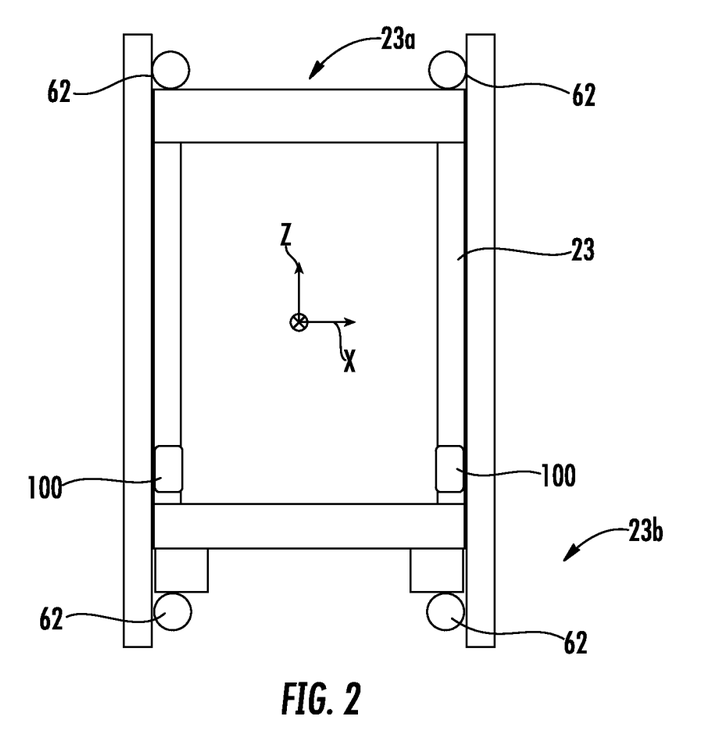
FIG. 2 illustrates a cross-sectional side view of an elevator car, in accordance with an embodiment of the disclosure.
Figure 3:
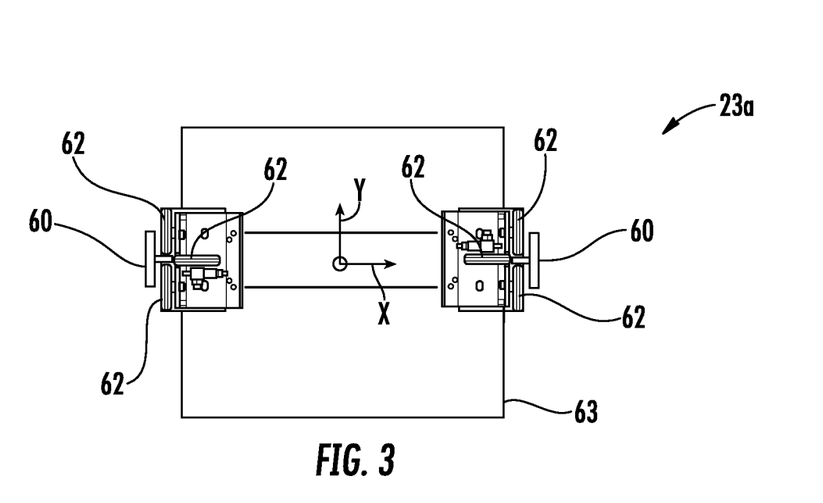
FIG. 3 illustrates a top view of an elevator car, in accordance with an embodiment of the disclosure.

Referring now to FIGS. 2 and 3. FIG. 2 illustrates a cross-sectional side view of the elevator car 23 and FIG. 3 illustrates a top view of top 23a of the elevator car 23. The elevator car 23 includes roller guides 62 that guide the elevator vertically along axis Z. The roller guides 62 roll along the guide rails 60 as the elevator car 23 moves along axis Z. As seen in FIG. 2 there may be roller guides 62 at the top 23a and bottom 23b proximate each guide rail 60. For example, as seen in FIG. 3, there may be three roller guides 62 abutting each guide rail 60 at the top 23a and bottom 23b of the elevator car 23. In operation the roller guides 62 limit sway of the elevator car 23 in direction X and direction Y as the elevator moves in direction Z. In operation the roller guides 62 also help create a smooth ride quality.

Figure 4:
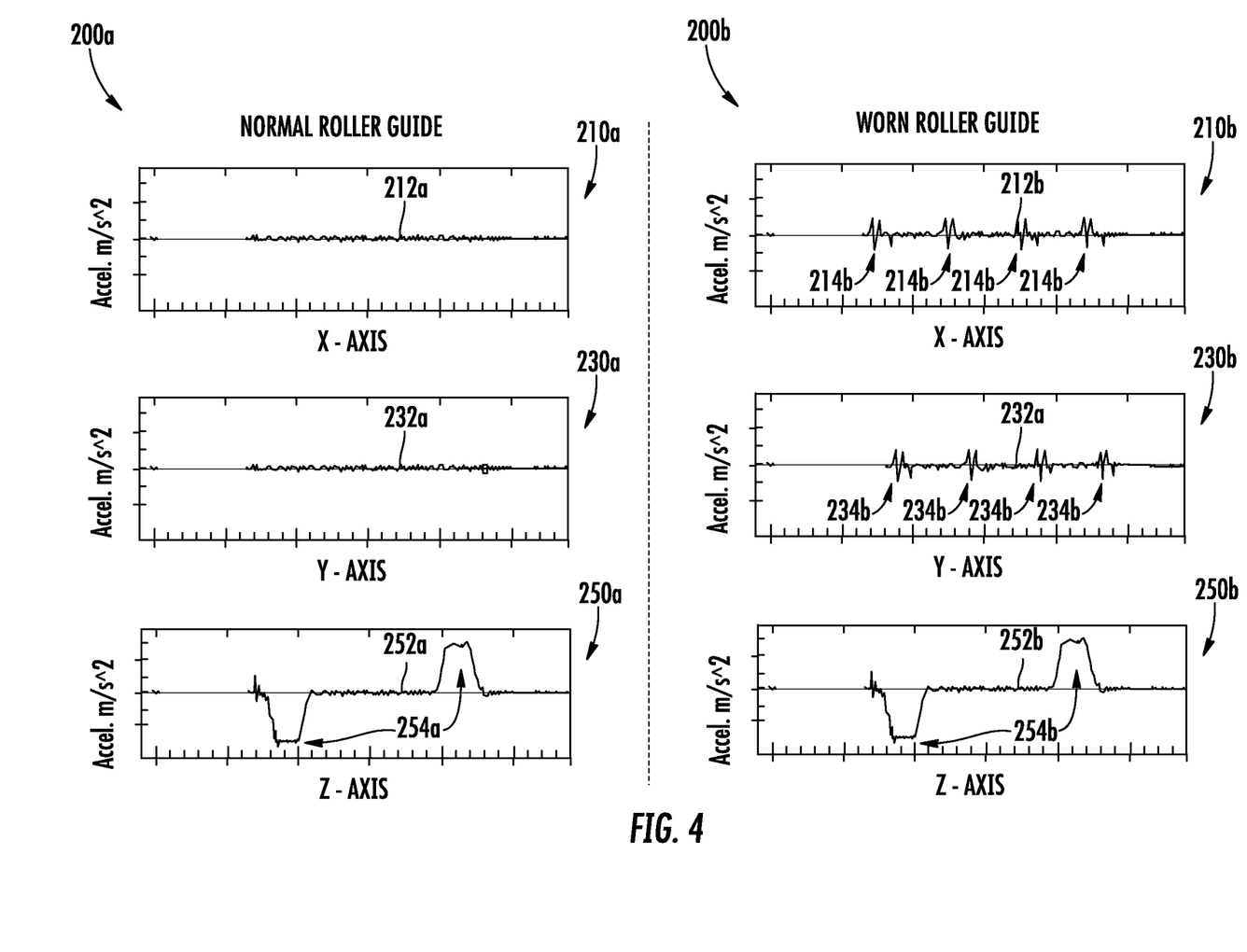
FIG. 4 illustrates vibrational signatures of a normal roller guide and a worn roller guide, in accordance with an embodiment of the disclosure.

Referring now to FIG. 4 with continued references to FIGS. 1-3. FIG. 4 shows the vibration signatures 212a, 232a, 252a for an elevator car 23 with normal roller guides 62 at 200a and the vibration signatures 212b, 232b, 252b for an elevator car 23 with worn roller guides 62 at 200b. As seen in FIG. 4, the vibration signatures 212, 232, 252 are shown in direction X at 210, direction Y at 230, and direction Z at 250. (Note: numerical reference characters without a letter refer to the reference character with that number followed by any letter; ex: 210 refers to 210a and 210b) Direction Z is the direction of travel of the elevator car 23, direction X is orthogonal to direction Z, and direction Y is orthogonal to both direction X and direction Z. Normal acceleration/deceleration of the elevator car 23 induces normal vibrations 254 in direction Z. A worn roller guide 62 may induce abnormal vibrations 214b, 234b in at least one of direction X and the direction Y. These abnormal vibrations 214b, 234b are repetitious vibrations as seen by the vibrations signature 212b in direction X and the vibration signature 232b in direction Y. The intensity of the abnormal vibrations 214b, 234b may depend upon the amount of ware wear present on the worn roller guide 62. The frequency of the abnormal vibrations 214b, 234b may depend upon a diameter of the roller guide 62 and the speed of the elevator car 23 at the time of the abnormal vibrations 214b, 234b. Thus, the controller 30 may determine a known vibratory signature of a worn roller guide 62 in response to the diameter of the roller guide 62 and the speed of the elevator car 23. For example, if there were to be excessive wear at a single point on the roller guide 62, one would expect to see a vibration every time that particular portion of a wheel that comprises the roller guide 62 contacts the guide rail 60. Then the controller 30 determines probable cause by comparing the detected vibratory signature of the elevator car and a known vibratory signature. The controller 30 matches the detected vibratory signature of the elevator car with a known vibratory signature to determine a probable cause of the vibratory signature. The probable cause may be determined to be a worn roller guide if the detected vibratory signature matches up with the known vibratory signature for a roller guide with the same diameter at the same elevator car speed. The amount of wear may also be determined in response to the amplitude of the abnormal vibrations 214*b*, 234*b*. Advantageously, a bump may be places on the roller guides 62 that generates a vibratory signature that is imperceptible to passengers in the elevator car 23 but perceptible to the accelerometer 130 when the elevator car 23 is in motion, such that when the bump is no longer perceptible by the accelerometer 130 then the roller guides 62 may need replacing.

Figure 5:
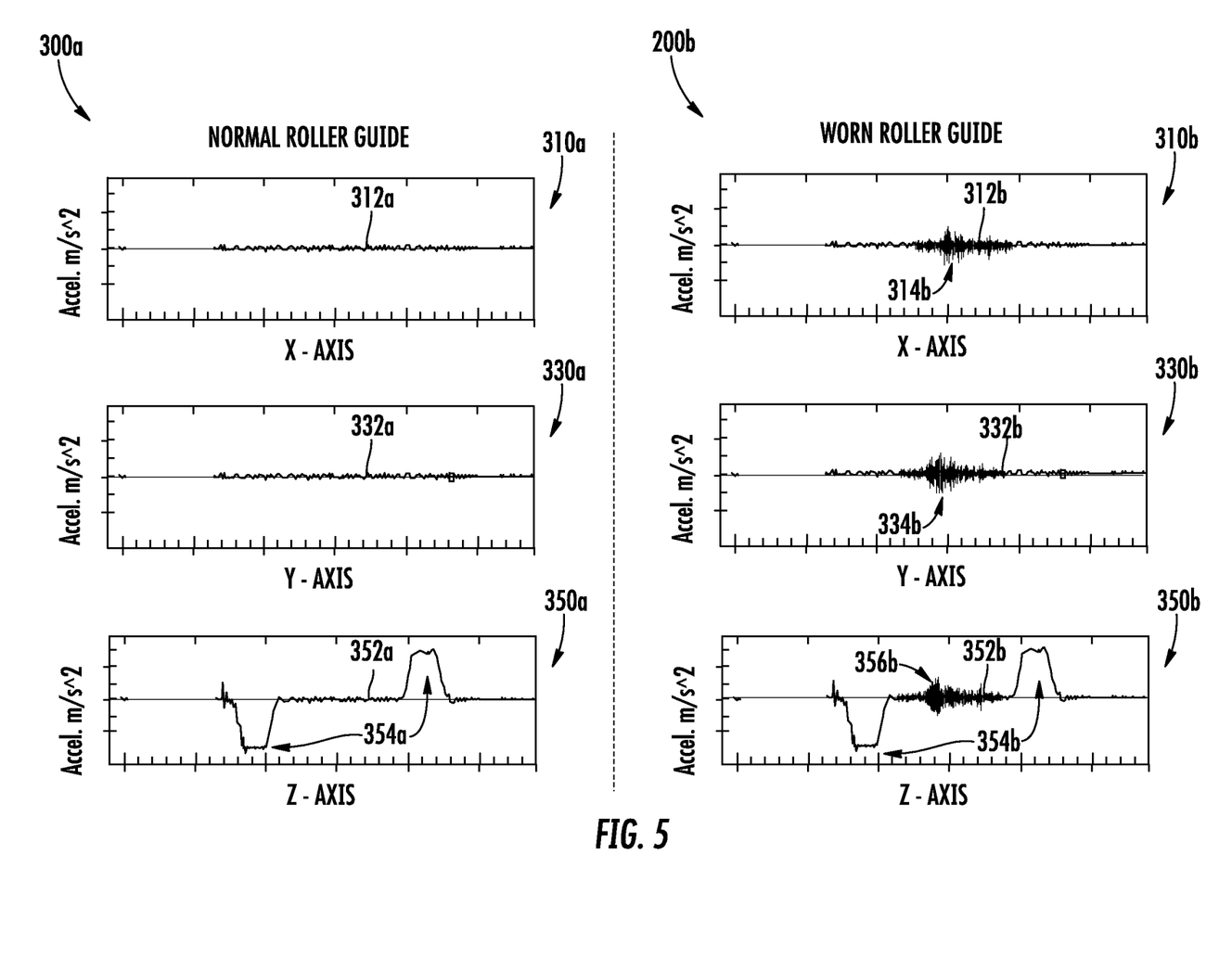
FIG. 5 illustrates vibrational signatures of a normal elevator run and a seismic elevator run, in accordance with an embodiment of the disclosure.

Referring now to FIG. 5 with continued references to FIGS. 1-3. FIG. 5 shows the vibration signatures 312*a*, 332*a*, 352*a* for an elevator car 23 with no seismic activity (ex: earthquake) at 300*a* and the vibration signatures 312*b*, 332*b*, 352*b* for an elevator car 23 with seismic activity at 300*b*. As seen in FIG. 5, the vibration signatures 312, 332, 352 are shown in direction X at 310, direction Y at 330, and direction Z at 350. Direction Z is the direction of travel of the elevator car 23, direction X is orthogonal to direction Z, and direction Y is orthogonal to both direction X and direction Z. Normal acceleration/deceleration of the elevator car 23 induces normal vibrations 354 in direction Z. Seismic activity may induce abnormal vibrations 314*b*, 334*b*, 356*b* in at least one of direction X, direction Y, and direction Z. These abnormal vibrations 314*b*, 334*b*, 356*b* include a period of a high magnitude low frequency vibration as seen by the vibrations signature 312*b* in direction X, the vibration signature 332*b* in direction Y, and vibration signature 352*b* in direction Z. High magnitude low frequency vibration in every direction X, Y, Z may be indicative of seismic activity. Thus, abnormal vibrations 314*b*, 334*b*, 356*b* including a period of a high magnitude low frequency vibration may be a known vibratory signature for seismic activity. The controller 30 determines probable cause by comparing the detected vibratory signature of the elevator car 23 and a known vibratory signature. The controller 30 matches the detected vibratory signature of the elevator car with a known vibratory signature to determine a probable cause of the vibratory signature. The probable cause may be determined to be a seismic activity if the detected vibratory signature matches up with the known vibratory signature for seismic activity. The magnitude of the seismic activity may also be determined in response to the amplitude of the abnormal vibrations 314*b*, 334*b*, 356*b*. In event a seismic activity is detected, the elevator car 23 may be stopped and/or a notification may be transmitted to an elevator monitoring facility indicating that the seismic activity has been detected.

Figure 6:
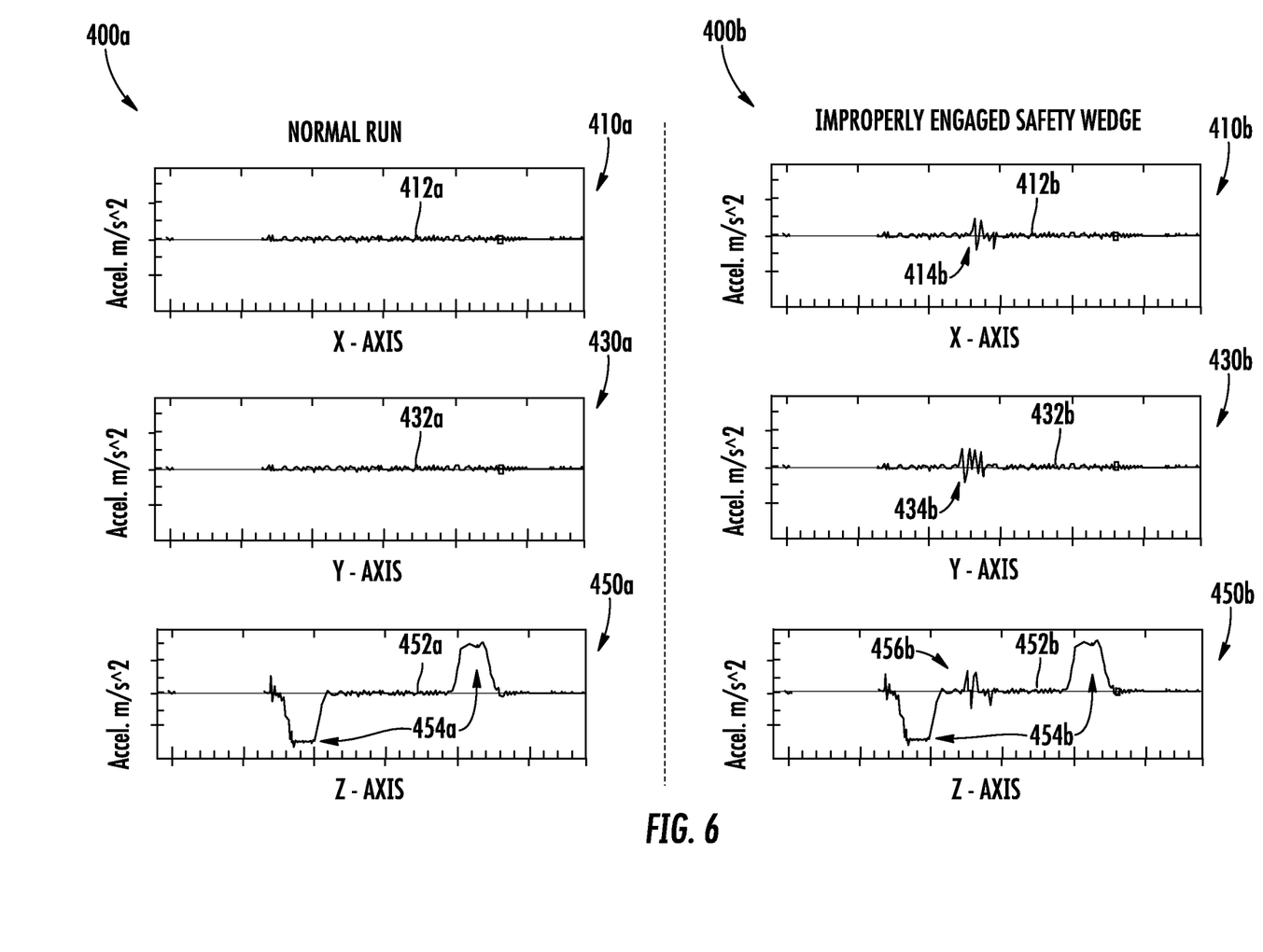
FIG. 6 illustrates vibrational signatures of a normal elevator run and an elevator run with an improperly engaged safety wedge system, in accordance with an embodiment of the disclosure.

Referring now to FIG. 6 with continued references to FIGS. 1-3. FIG. 6 shows the vibration signatures 412*a*, 432*a*, 452*a* for an elevator car 23 with a properly engaged safety wedge system 123 at 400*a* and the vibration signatures 412*b*, 432*b*, 452*b* for an elevator car 23 with an improperly engaged safety wedge 132 at 400*b*. An improperly engaged safety wedge system 123 may be slowing the elevator car 23 when it is not supposed to be slowed by engaging the rail 60. As seen in FIG. 6, the vibration signatures 412, 432, 452 are shown in direction X at 410, direction Y at 430, and direction Z at 450. Direction Z is the direction of travel of the elevator car 23, direction X is orthogonal to direction Z, and direction Y is orthogonal to both direction X and direction Z. Normal acceleration/deceleration of the elevator car 23 induces normal vibrations 454 in direction Z. An improperly engaged safety wedge system 123 may induce abnormal vibrations 414*b*, 434*b*, 456*b* in at least one of direction X, direction Y, and direction Z. These abnormal vibrations 414*b*, 434*b*, 456*b* include previously undetected vibration as seen by the vibrations signature 412*b* in direction X, the vibration signature 432*b* in direction Y, and vibration signature 452*b* in direction Z. Since a safety wedge system 123 may be located on each side of the elevator car 23 (see FIG. 1) a single improperly engaged safety wedge system 123 may cause an abnormal vibration in direction Z and at least one of direction X and direction Y. For example, an improperly engaged safety wedge system on the left of an elevator car 23 may try to brake before a properly engaged safety wedge system on the right side of an elevator car, which may induce an abnormal vibration "up and to the left" when braking upward and "down and to the left" when braking downward. Thus, abnormal vibrations 414*b*, 434*b*, 456*b* including a previously undetected vibration in direction Z and at least one of direction X and direction Y may be a known vibratory signature for an improperly engaged safety wedge system 123. The controller 30 determines probable cause by comparing the detected vibratory signature of the elevator car 23 and a known vibratory signature. The controller 30 matches the detected vibratory signature of the elevator car 23 with a known vibratory signature to determine a probable cause of the vibratory signature. The probable cause may be determined to be an improperly engaged safety wedge system 123 if the detected vibratory signature matches up with the known vibratory signature for an improperly engaged safety wedge system 123. The amount that the safety wedge system 123 is improperly engaged may also be determined in response to the amplitude of the abnormal vibrations 414*b*, 434*b*, 456*b*.

Figure 7:
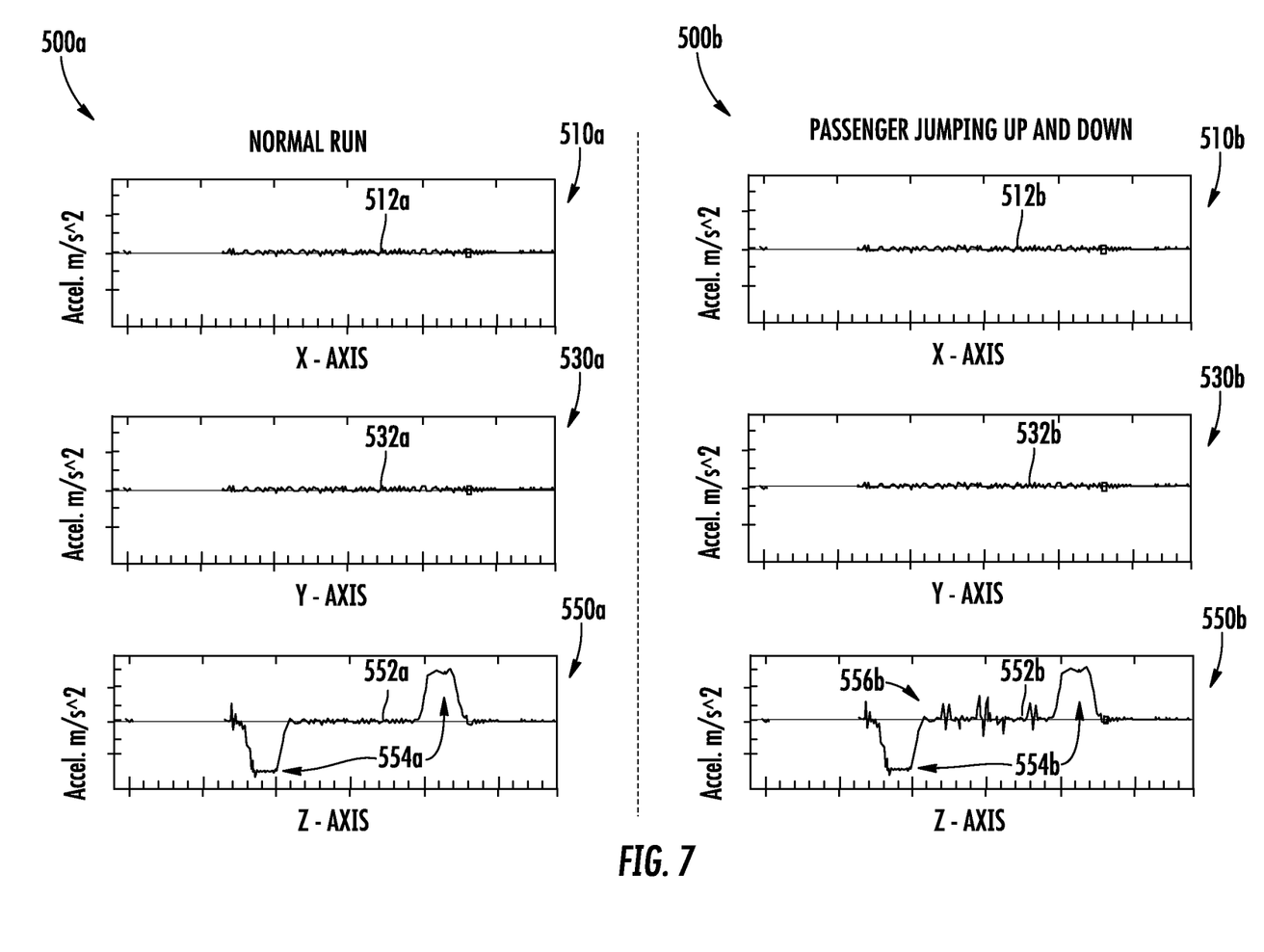
FIG. 7 illustrates vibrational signatures of a normal elevator run and an elevator run with a jumping passenger, in accordance with an embodiment of the disclosure.

Referring now to FIG. 7 with continued references to FIGS. 1-3. FIG. 7 shows the vibration signatures 512*a*, 532*a*, 552*a* for an elevator car 23 with no jumping passenger at 500*a* and the vibration signatures 512*b*, 532*b*, 552*b* for an elevator car 23 with a jumping passenger at 500*b*. As seen in FIG. 7, the vibration signatures 512, 532, 552 are shown in direction X at 510, direction Y at 530, and direction Z at 550. Direction Z is the direction of travel of the elevator car 23, direction X is orthogonal to direction Z, and direction Y is orthogonal to both direction X and direction Z. Normal acceleration/deceleration of the elevator car 23 induces normal vibrations 554 in direction Z. A jumping passenger may induce abnormal vibrations 556 in direction Z. These abnormal vibrations 556*b* include previously undetected vibration as seen by the vibration signature 552*b* in direction Z. Thus, abnormal vibrations 556*b* including a previously undetected vibration in direction Z may be a known vibratory signature for a jumping passenger. The controller 30 determines probable cause by comparing the detected vibratory signature of the elevator car 23 and a known vibratory signature. The controller 30 matches the detected vibratory signature of the elevator car with a known vibratory signature to determine a probable cause of the vibratory signature. In an example, the known vibratory signatures may be developed from a series of real world tests and/or predictive calculations. The probable cause may be determined to be jumping passenger if the detected vibratory signature matches up with the known vibratory signature for a jumping passenger. The number of jumping passengers may also be determined in response to the amplitude of the abnormal vibrations 556*b*. Advantageously, by determining that the vibratory signature is a jumping passenger, a safety brake 120 may not be actuated and a warning message may be activated to alert the passengers in the elevator car 23 to stop jumping.

Figure 8:
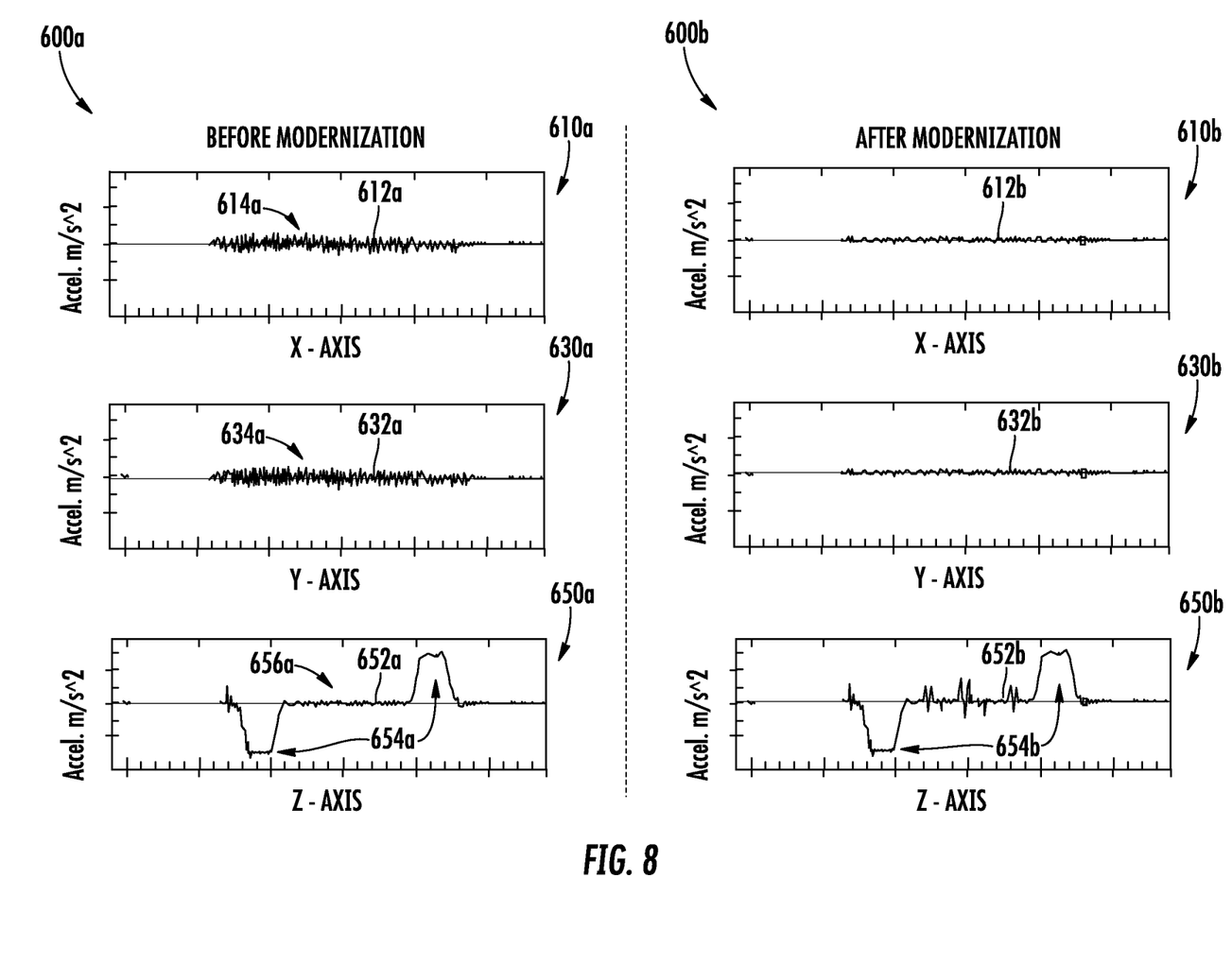
FIG. 8 illustrates vibrational signatures of an elevator run prior to a modernization and an elevator run after a modernization, in accordance with an embodiment of the disclosure.

Referring now to FIG. 8 with continued references to FIGS. 1-3. FIG. 8 shows the vibration signatures 612a, 632a, 652a for an elevator car 23 before a modernization at 600a and the vibration signatures 612b, 632b, 652b for an elevator car 23 after a modernization at 600b. A modernization may be an upgrade to new elevator parts. As seen in FIG. 8, the vibration signatures 612, 632, 652 are shown in direction X at 610, direction Y at 630, and direction Z at 650. Direction Z is the direction of travel of the elevator car 23, direction X is orthogonal to direction Z, and direction Y is orthogonal to both direction X and direction Z. Normal acceleration/deceleration of the elevator car 23 induces normal vibrations 654 in direction Z. Prior to a modernization of an elevator car 23 various components of the elevator care may induce abnormal vibrations 614a, 634a, 656a in at least one of direction X, direction Y, and direction Z. These abnormal vibrations 614a, 634a, 656a by a human and/or a computer in order to recommend new components to modernize the elevator in order to reduce vibration signatures 612, 632, 652. Advantageously, the vibration signatures 612a, 632a, 652a for an elevator car 23 before a modernization at 600a may be compared to the vibration signatures 612b, 632b, 652b for an elevator car 23 after a modernization at 600b to determine the reduction in vibration of the elevator car due to modernization. Success of the modernization may be judged by comparing the vibratory signatures 612b, 632b, 652b for the elevator car 23 after the modernization at 600b to an internal vibratory standard.

Figure 9:
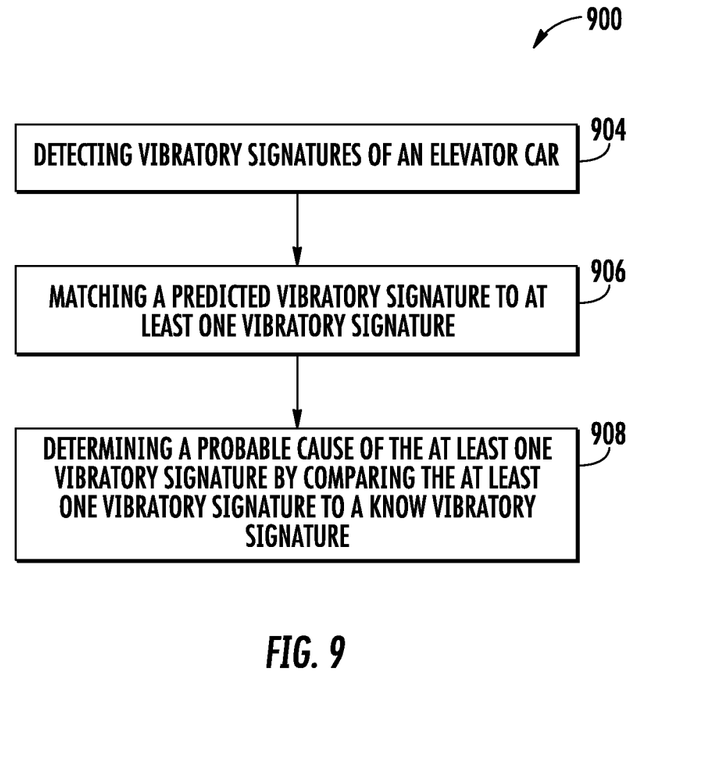
FIG. 9 is a flow chart of a method of monitoring vibratory signatures of an elevator car, in accordance with an embodiment of the disclosure.

Referring now to FIG. 9, with continued reference to FIGS. 1-8. FIG. 9 shows a flow chart of method 900 of monitoring vibratory signatures of an elevator car 23, in accordance with an embodiment of the disclosure. At block 904, vibratory signatures of an elevator car 23 are detected. The vibratory signatures comprises: a first vibratory signature in a first direction (e.g. direction Z) parallel to the motion of an elevator car; a second vibratory signature in a second direction (e.g. direction X) orthogonal to the first direction; a third vibratory signature in a third direction (e.g. direction Y) orthogonal to the first direction and the second direction. At block 906 a known vibratory signature is compared to at least one vibratory signature. At block 908, a probable cause of the at least one vibratory signature is determined by comparing the at least one vibratory signature to a known vibratory signature. Once a probable cause is determined an alarm may be activated and/or the probable cause may be sent to a remote device, such as, for example a computer where an elevator technician may examine the probable cause. In an embodiment, the movement of the elevator car may be adjusted in response to the probable cause.

While the above description has described the flow process of FIG. 9 in a particular order, it should be appreciated that unless otherwise specifically required in the attached claims that the ordering of the steps may be varied.

As described above, embodiments can be in the form of processor-implemented processes and devices for practicing those processes, such as processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of monitoring vibratory signatures of an elevator car, the method comprising:
   detecting at least one vibratory signature of the elevator car using an accelerometer of an electronic safety actuator that is operably connected to a safety brake for the elevator car, the at least one vibratory signature comprising:
   a first vibratory signature in a first direction;
   a second vibratory signature in a second direction orthogonal to the first direction; and
   a third vibratory signature in a third direction orthogonal to the first direction and the second direction; and
   determining a probable cause of the at least one vibratory signature by comparing the at least one vibratory signature to a known vibratory signature.

2. The method of claim 1, further comprising:
   activating an alarm in response to the probable cause being determined.

3. The method of claim 2, further comprising:
   transmitting the probable cause to a remote device.

4. The method of claim 3, further comprising:
   adjusting movement of the elevator car in response to the probable cause.

5. The method of claim 4, further comprising:
   stopping movement of the elevator car in response to the probable cause.

6. The method of claim 4, further comprising:
determining the known vibratory signature in response to a speed of the elevator car and a diameter of roller guides of the elevator car.

7. The method of claim 1, wherein:
if at least one of the second vibratory signature and the third vibratory signature includes a repetitious vibration, then the probable cause is determined to be a faulty roller guide.

8. The method of claim 1, wherein:
if each vibratory signature includes a period of a high magnitude low frequency vibration, then the probable cause is determined to be seismic activity.

9. The method of claim 1, wherein:
if the first vibratory signature includes at least one previously undetected low frequency vibration, then the probable cause is determined to be a jumping passenger.

10. The method of claim 1, wherein:
if each vibratory signature includes a previously undetected vibration in the first direction and at least one of the second direction and the third direction when the elevator car is stopping, then the probable cause is determined to be an improperly engaged safety wedge system.

11. The method of claim 4, wherein:
the first direction is parallel to a direction of travel of the elevator car.

12. A system for monitoring vibratory signatures of an elevator car, the system comprising:
an accelerometer of an electronic safety actuator that is operably connected to a safety brake for the elevator car, the accelerometers being configured to detect at least one vibratory signature of the elevator car, wherein the at least one vibratory signature comprises:
a first vibratory signature in a first direction;
a second vibratory signature in a second direction orthogonal to the first direction; and
a third vibratory signature in a third direction orthogonal to the first direction and the second direction; and
a controller in communication with the accelerometer and configured to determine a probable cause of the at least one vibratory signature by comparing the at least one vibratory signature to a known vibratory signature.

13. The system of claim 12, further comprising:
an alarm configured to activate in response to the probable cause.

14. The system of claim 12, further comprising:
a remote device configured to receive the probable cause transmitted by the controller.

15. The system of claim 12, further comprising:
a bump located on a roller guide of the elevator car, wherein the bump is configured to generate a vibratory signature that is imperceptible to passengers in the elevator car but perceptible to the accelerometers when the elevator car is in motion.

* * * * *